(12) United States Patent
Kajimoto et al.

(10) Patent No.: US 12,695,338 B2
(45) Date of Patent: Jul. 28, 2026

(54) MOTOR THAT IS CONFIGURED TO ENSURE INSULATION BETWEEN THE COIL END AND THE HOUSING

(71) Applicant: TOYOTA JIDOSHA KABUSHIKI KAISHA, Toyota (JP)

(72) Inventors: Shogo Kajimoto, Toyota (JP); Hiroaki Urano, Miyoshi (JP); Yukio Tsuchiya, Toyota (JP); Yutaro Ikeda, Toyota (JP); Hideki Nakagawa, Toyota (JP); Kentaro Yoshioka, Toyota (JP); Yuta Narisawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 267 days.

(21) Appl. No.: 18/529,375

(22) Filed: Dec. 5, 2023

(65) Prior Publication Data

US 2024/0186847 A1 Jun. 6, 2024

(30) Foreign Application Priority Data

Dec. 6, 2022 (JP) ................................. 2022-195121

(51) Int. Cl.
| | |
|---|---|
| *H02K 1/20* | (2006.01) |
| *H02K 3/50* | (2006.01) |
| *H02K 9/19* | (2006.01) |

(52) U.S. Cl.
CPC ................. *H02K 1/20* (2013.01); *H02K 3/50* (2013.01); *H02K 9/19* (2013.01); *H02K 2203/06* (2013.01)

(58) Field of Classification Search
CPC .. H02K 1/20; H02K 1/12; H02K 1/00; H02K 3/00; H02K 3/46; H02K 3/24; H02K 9/00;

(Continued)

(56) References Cited

U.S. PATENT DOCUMENTS

| | | |
|---|---|---|
| 11,125,315 B2 | 9/2021 | Graves et al. |
| 2010/0045125 A1 | 2/2010 | Takenaka et al. |

(Continued)

FOREIGN PATENT DOCUMENTS

| | | | | |
|---|---|---|---|---|
| CN | 104953745 B | * | 4/2018 | ............... H02K 9/19 |
| DE | 102020212894 A1 | * | 4/2022 | ............. H02K 5/203 |

(Continued)

OTHER PUBLICATIONS

Text Version of EP 2580852 B1 (Year: 2020).*

(Continued)

*Primary Examiner* — Alexander A Singh
*Assistant Examiner* — Charlie Frank Mann, Jr.
(74) *Attorney, Agent, or Firm* — Oliff PLC

(57) ABSTRACT

A motor may include: a stator comprising a stator core and a coil; a housing that houses the stator; and a first annular member that provides a seal between a first end face of the stator core and an inner wall surface of the housing. The inner wall surface may include a first inner wall surface radially facing a first coil end of the coil and a second inner wall surface facing the first coil end. The first annular member may include: a first portion having a cylindrical shape and interposed between the first coil end and the first inner wall surface; and a second portion protruding radially inward from the first portion and interposed between the first coil end and the second inner wall surface. The first portion may include a plurality of first holes through which refrigerant is injected toward the first coil end.

9 Claims, 9 Drawing Sheets

(58) Field of Classification Search
CPC ...... H02K 9/19; H02K 2203/06; H02K 9/193;
H02K 3/50
See application file for complete search history.

(56) References Cited

U.S. PATENT DOCUMENTS

| | | | |
|---|---|---|---|
| 2013/0062974 A1* | 3/2013 | Chamberlin | H02K 5/203 |
| | | | 310/59 |
| 2019/0006914 A1* | 1/2019 | Graves | F16H 57/046 |
| 2019/0273420 A1* | 9/2019 | Yasuda | H02K 1/20 |

FOREIGN PATENT DOCUMENTS

| | | | | |
|---|---|---|---|---|
| EP | 2580852 B1 | * | 12/2020 | ............... H02K 9/19 |
| JP | 2003-235195 A | | 8/2003 | |
| JP | 2010-051130 A | | 3/2010 | |
| JP | 2019-154146 A | | 9/2019 | |
| JP | 2020120470 A | * | 8/2020 | ............... H02K 9/19 |
| JP | 2022034309 A | * | 3/2022 | |

OTHER PUBLICATIONS

Machine Translation of JP 2022034309 A (Year: 2022).*
Machine Translation of DE 102020212894 A1 (Year: 2022).*
Machine Translation of JP 2020120470 A (Year: 2020).*
Machine Translation of CN 104953745 B (Year: 2018).*

* cited by examiner

21

50c1

MOTOR THAT IS CONFIGURED TO ENSURE INSULATION BETWEEN THE COIL END AND THE HOUSING

REFERENCE TO RELATED APPLICATION

This application claims priority from Japanese Patent Application No. 2022-195121 filed on Dec. 6, 2022. The entire content of the priority application is incorporated herein by reference.

BACKGROUND ART

The technology disclosed herein relates to motors.

In a motor described in U.S. patent Ser. No. 11/125,315, a stator is housed in a housing. A plurality of injection holes is formed in an annular member that provides a seal between an axial end face of a stator core and an inner surface of the housing. Refrigerant is injected toward a coil end through each of the injection holes.

DESCRIPTION

Reducing the size of a motor may require a coil end to be located close to an inner surface of a housing. In this case, it may be difficult to ensure insulation between the coil end and the housing.

A motor disclosed herein may comprise a stator comprising a stator core and a coil; a housing that houses the stator; and a first annular member that is insulative and provides a seal between a first end face of the stator core in an axial direction of an axis of the stator core and an inner wall surface of the housing. The coil may comprise a first coil end protruding from the first end face. The inner wall surface may comprise a first inner wall surface radially facing the first coil end and a second inner wall surface facing the first coil end in the axial direction. The first annular member may comprise a first portion having a cylindrical shape about the axis and interposed between the first coil end and the first inner wall surface; and a second portion protruding radially inward from the first portion and interposed between the first coil end and the second inner wall surface. The first portion may comprise a plurality of first holes through which refrigerant is injected toward the first coil end.

The refrigerant may comprise various types of refrigerants. For example, the refrigerant may be cooling oil. Alternatively, the refrigerant may be a liquid such as water or a gaseous fluid. In the configuration above, insulation between the first coil end and the second inner wall surface of the housing can be enhanced by the second portion of the first annular member, which is insulative. The first annular member can serve a function of cooling the first coil end as well as a function of insulating the first coil end. The size of the motor can be reduced.

Figure 1:
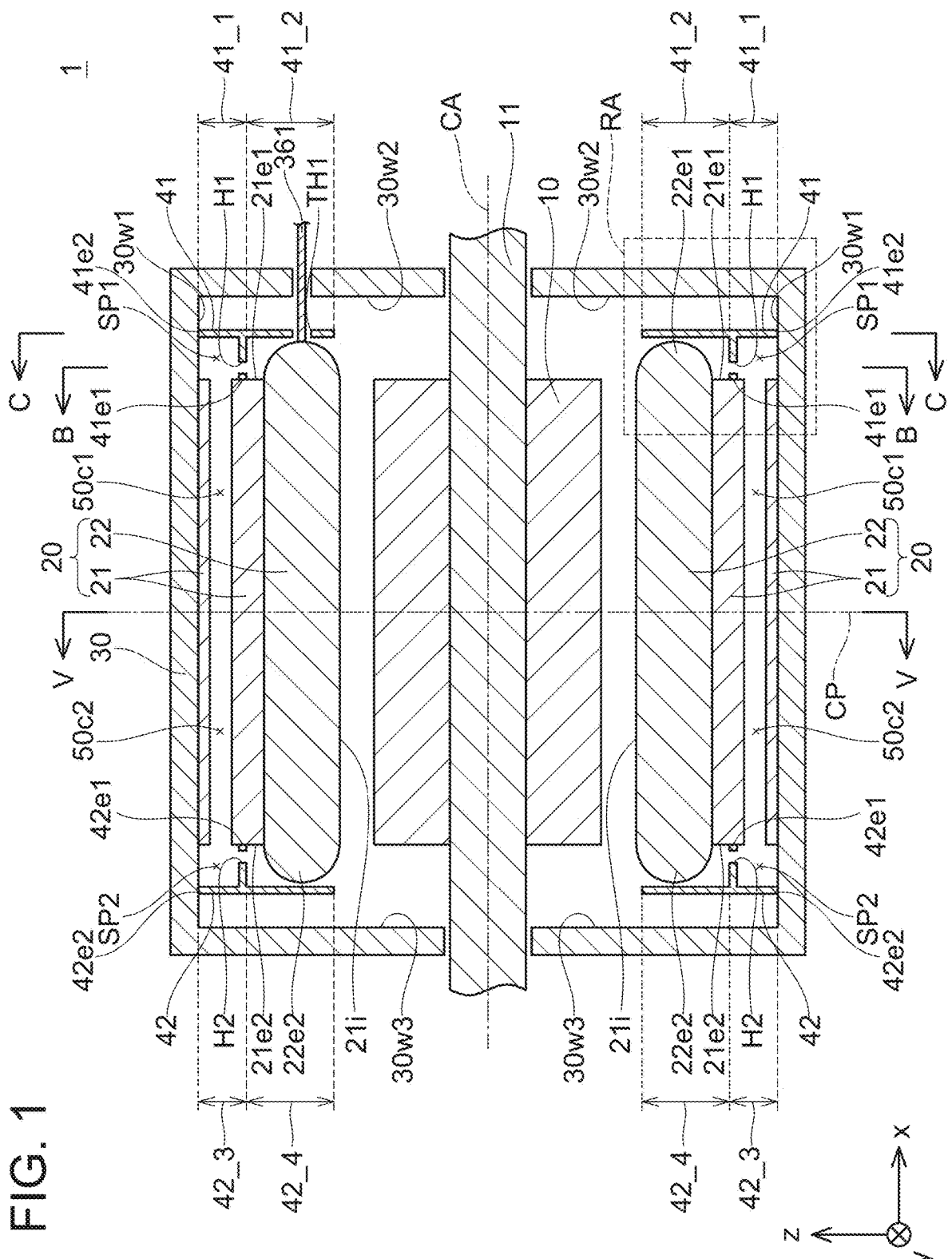
FIG. 1 is a schematic cross-sectional view of a motor 1.

The plurality of first holes may be located between the first end face and a connection at which the second portion is connected to the first portion.

In the configuration above, the refrigerant injected from the first holes is guided by the second portion toward the first coil end. This increases an amount of the refrigerant reaching the first coil end and thus increases cooling efficiency.

The first annular member may be constituted of insulating resin.

The configuration above ensures enhanced insulation between the first coil end and the second inner wall surface of the housing.

The coil may comprise a plurality of segment coils and outer surfaces of the segment coils may be coated with insulating films. At the first coil end, ends of the plurality of segment coils may be each exposed from the insulating films.

A short circuit is more likely to occur between the ends of the segment coils exposed from the insulating films and the second inner wall surface of the housing than between portions of the segment coils coated with the insulating films and the second inner wall surface. In the configuration above, insulation between the ends of the segment coils exposed from the insulating films and the second inner wall surface of the housing is enhanced by the second portion of the first annular member.

The second portion may have a ring shape about the axis.

In this configuration, insulation is enhanced over the entire circumference about the axis.

The stator core may comprise a stator core inner surface that defines a cylindrical opening about the axis. A radial inner end of the second portion having the ring shape may be located radially outward of the stator core inner surface.

This configuration prevents the second portion from interrupting movement of a rotary part of the motor.

A thickness of a radial inner end of the second portion having the ring shape may be less than a thickness of a radial outer end of the second portion.

In this configuration, the second portion is tapered from its base toward its distal end. Since the weight is reduced near the distal end, a bending moment applied to the base of the second portion can be reduced. Breakage of the second portion and oscillation in the second portion can be suppressed.

At least a part of the second portion may be in contact with the second inner wall surface.

This configuration allows for minimization of a distance between the second portion and the second inner wall surface. The size of the motor can be further reduced.

The motor may further comprise a plurality of power lines projecting from the first coil end in the axial direction. The second portion may comprise at least one through hole or at least one notch through which the plurality of power lines extends.

In this configuration, the second portion can be appropriately located even with the presence of the plurality of power lines.

The motor may further comprise a second annular member that is insulative and provides a seal between a second end face of the stator core and the inner wall surface of the housing, the second end face being opposite to the first end face of the stator core in the axial direction. The coil may comprise a second coil end protruding from the second end face of the stator core. The first inner wall surface of the housing may radially face the second coil end. The inner wall surface of the housing may further comprise a third inner wall surface facing the second coil end in the axial direction. The second annular member may comprise a third portion having a cylindrical shape about the axis and interposed between the second coil end and the third inner wall surface; and a fourth portion protruding radially inward from the third portion and interposed between the second coil end and the third inner wall surface. The third portion may comprise a plurality of second holes through which the refrigerant is injected toward the second coil end.

In this configuration, the second annular member can serve a function of cooling the second coil end as well as a function of insulating the second coil end. The size of the motor can be reduced.

The motor may further comprise a second annular member that is insulative and provides a seal between a second end face of the stator core and the inner wall surface of the housing, the second end face being opposite to the first end face of the stator core in the axial direction. The coil may comprise a second coil end protruding from the second end face of the stator core. The first inner wall surface of the housing may radially face the second coil end. The inner wall surface of the housing may further comprise a third inner wall surface facing the second coil end in the axial direction. The second annular member may have a cylindrical shape about the axis and is interposed between the second coil end and the first inner wall surface. The second annular member may comprise a plurality of second holes through which the refrigerant is injected toward the second coil end. The second annular member may not be interposed between the second coil end and the third inner wall surface.

The configuration above provides insulation more intensively to the first coil end than to the second coil end.

Representative, non-limiting examples of the present disclosure will now be described in further detail with reference to the attached drawings. This detailed description is merely intended to teach a person of skill in the art further details for practicing preferred aspects of the present teachings and is not intended to limit the scope of the disclosure. Furthermore, each of the additional features and teachings disclosed below may be utilized separately or in conjunction with other features and teachings to provide improved motors.

Moreover, combinations of features and steps disclosed in the following detailed description may not be necessary to practice the disclosure in the broadest sense, and are instead taught merely to particularly describe representative examples of the disclosure. Furthermore, various features of the above-described and below-described representative examples, as well as the various independent and dependent claims, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

EMBODIMENTS

First Embodiment

Configuration of Motor 1

Figure 2:
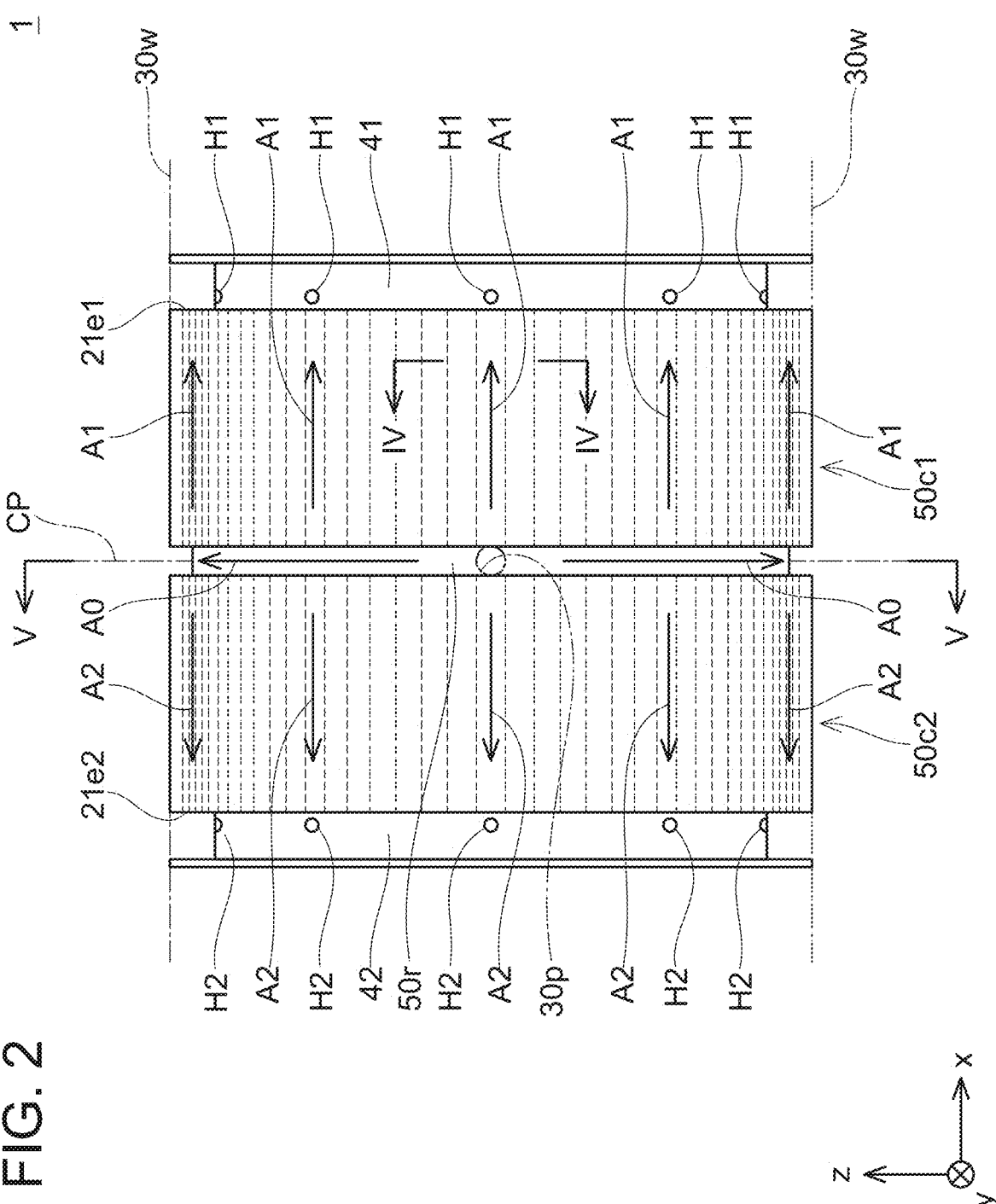
FIG. 2 is a side view of a stator 20, etc.

FIG. 1 shows a schematic cross-sectional view of a motor 1 according to an embodiment. FIG. 2 shows a side view of a stator 20, a first annular member 41, and a second annular member 42. In FIG. 2, depictions of a housing 30, a rotor 10, and a rotation shaft 11 are omitted for the sake of clarity, and an inner wall surface 30$w$ and a supply port 30$p$ of the housing 30 are represented by imaginary lines. In FIGS. 1 and 2, z-direction is a vertical direction, and x-direction and y-direction are horizontal directions. The x-direction is a direction in which the rotation shaft 11 extends. These directions also apply to the other drawings.

The motor 1 is mounted on an electric-powered vehicle. The electric-powered vehicle comprises a hybrid vehicle and an electric vehicle. In the electric-powered vehicle, the motor 1 may be used as a traction motor that generates power for the vehicle to travel, or as a generator that generates electric power from regenerative braking power and/or excess power of an engine. In the electric-powered vehicle, the motor 1 is mounted such that −z-direction is coincident with the gravity direction.

As shown in FIG. 1, the motor 1 comprises a center plane CP perpendicular to the rotation shaft 11. The center plane CP passes the center of a stator core 21 in its axial direction. The structure of the motor 1 is symmetric with respect to the center plane CP. Thus, hereinafter, the structure on +x-direction side relative to the center plane CP is mainly described.

The motor 1 mainly comprises the rotor 10, the stator 20, the housing 30, the first annular member 41, and the second annular member 42. The rotor 10 comprises the rotation shaft 11. The rotation shaft 11 is supported by the housing 30 via a bearing (not shown) and is rotatable. The rotor 10 is fixed to the rotation shaft 11.

The stator 20 comprises the stator core 21 and a coil 22. The stator core 21 is a substantially annular member formed, for example, of a stack of steel plates. The stator core 21 includes a first end face 21$e$1 at its one end in the axial direction (x-direction) and a second end face 21$e$2 at its other end in the axial direction. A wire that constitutes the coil 22 is wound around the stator core 21. A first coil end 22$e$1 of the coil 22 protrudes in the axial direction from the first end face 21$e$1. A second coil end 22$e$2 of the coil 22 protrudes in the axial direction from the second end face 21$e$2.

The stator core 21 also comprises a center axis CA. The center axis CA of the stator core 21 is coincident with the center axis of the rotation shaft 11. The stator core 21 comprises a stator core inner surface 21$i$. The stator core inner surface 21$i$ defines a cylindrical opening about the center axis CA. The rotor 10 is disposed within this opening.

Figure 3A:
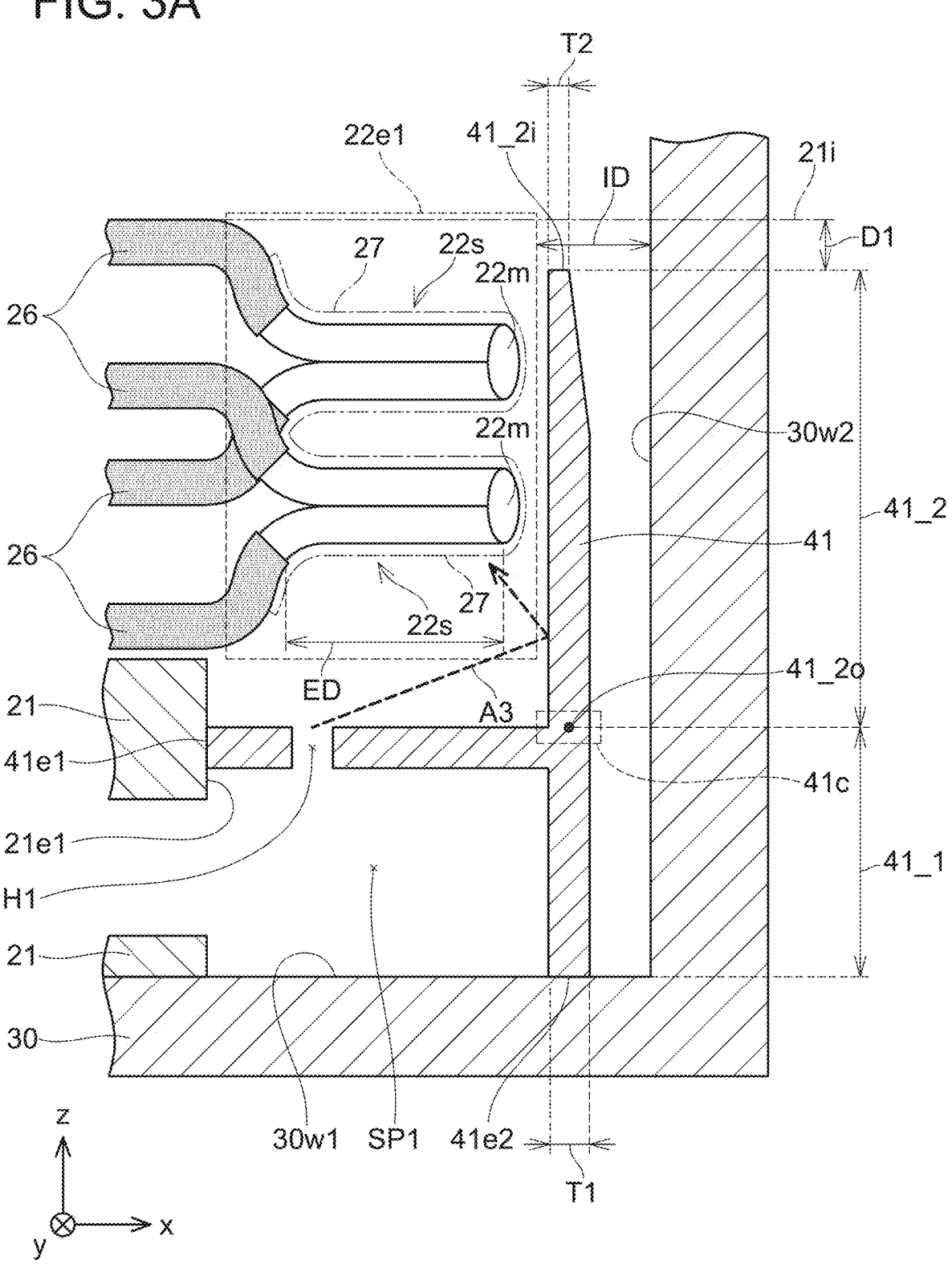
FIG. 3A is a schematic enlarged view of a region RA in FIG. 1.

FIG. 3A shows a schematic enlarged view of a region RA in FIG. 1. The coil 22 comprises a plurality of segment coils 22$s$. In FIG. 3A, only a few of the segment coils 22$s$ are shown. Further, in FIG. 3A, the segment coils 22$s$ are shown in side view, while the others are shown in cross-sectional view. Outer surfaces of the segment coils 22$s$ are coated with insulating films 26. End portions ED of the segment coils 22$s$ are located at the first coil end 22$e$1. The end portions ED are exposed from the insulating films 26. As shown in FIG. 3A, ends of the end portions ED of a pair of segment coils 22$s$ are welded with the end portions ED being in contact with each other. Thus, welding marks 22*m* are formed at the ends of the end portions ED.

The end portions ED of the segment coils may be each coated with an insulator 27. In FIG. 3A, the insulator is represented by an imaginary line. The insulator 27 may comprise a variety of insulators, and may be, for example, impregnating resin or powder coating. This enhances insulation for the end portions ED.

On the other hand, end portions of the segment coils are not located at the second coil end 22*e*2. Further, at the second coil end 22*e*2, the segment coils are coated with the insulating films. Therefore, no welding marks are formed at the second coil end 22*e*2. That is, configurations of the first coil end 22*e*1 and the second coil end 22*e*2 are different from each other.

In FIG. 1, the housing 30 is a member that houses the rotor 10 and the stator 20. The housing 30 surrounds the stator 20. A supply hole 30*p*, which will be described later, is defined in a side surface of the housing 30. A cooling oil reservoir (not shown) is disposed at a bottom portion of the housing 30. The inner wall surface of the housing 30 comprises a first inner wall surface 30*w*1, a second inner wall surface 30*w*2, and a third inner wall surface 30*w*3. The first inner wall surface 30*w*1 radially faces the first coil end 22*e*1. In other words, the first inner wall surface 30*w*1 surrounds the outer circumference of the first coil end 22*e*1. The second inner wall surface 30*w*2 faces the first coil end 22*e*1 in the axial direction. In other words, the second inner wall surface 30*w*2 is located in +x-direction relative to the first coil end 22*e*1. The third inner wall surface 30*w*3 faces the second coil end 22*e*2 in the axial direction. In other words, the third inner wall surface 30*w*3 is located in −x-direction relative to the second coil end 22*e*2. Known prior art can be applied for basic configuration of the housing 30, and thus its detailed description is omitted here.

The first annular member 41 is constituted of insulating resin. The first annular member 41 comprises a first portion 41_1 and a second portion 41_2. Referring to FIG. 3A, the first portion 41_1 of the first annular member 41 is described. The first portion 41_1 has a cylindrical shape about the center axis CA. The first portion 41_1 is interposed between the first coil end 22*e*1 and the first inner wall surface 30*w*1. A first end 41*e*1 of the first portion 41_1 is connected to the first end face 21*e*1 of the stator core 21. A second end 41*e*2 of the first portion 41_1 is connected to the first inner wall surface 30*w*1 of the housing 30. In this way, the first portion 41_1 provides a seal between the first end face 21*e*1 and the first inner wall surface 30*w*1. A variety of features that enhance the sealability (e.g., seal groove) may be applied to the connection between the first end 41*e*1 and the first end face 21*e*1 and between the second end 41*e*2 and the first inner wall surface 30*w*1.

A space SP1 is defined between the first portion 41_1 and the first inner wall surface 30*w*1. The space SP1 has a ring shape about the rotation shaft 11. The first portion 41_1 surrounds the first coil end 22*e*1. In other words, the first portion 41_1 radially faces the first coil end 22*el*.

The first portion 41_1 comprises a plurality of first holes H1. Cooling oil is injected through the plurality of first holes H1 toward the first coil end 22*e*1. The plurality of first holes H1 is located between the first end face 21*e*1 and a connection 41*c*. The connection 41*c* is where the second portion 41_2 is connected to the first portion 41_1.

Figure 3B:
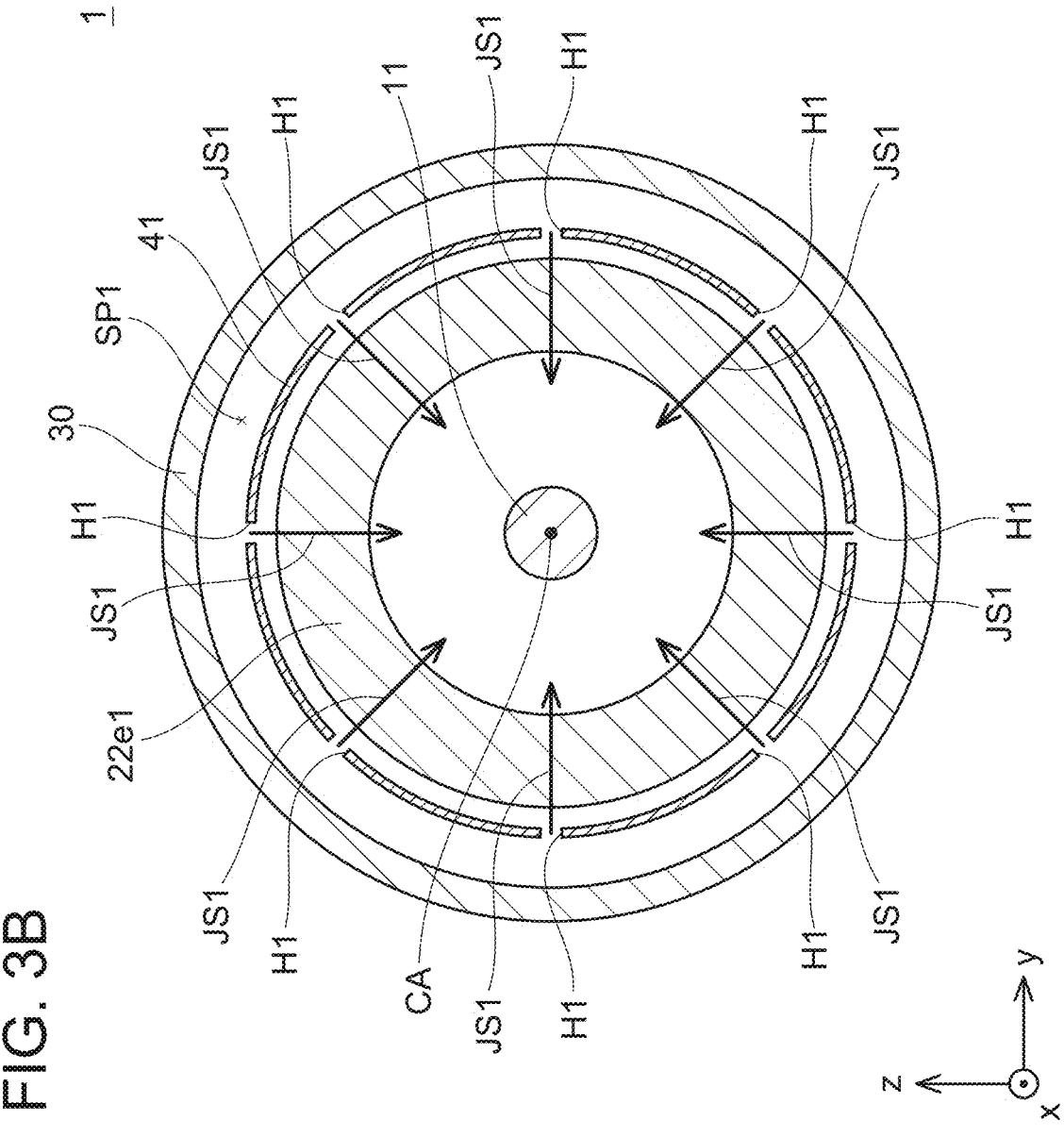
FIG. 3B is a schematic cross-sectional view along a line B-B in FIG. 1.

Referring to FIG. 3B, the plurality of first holes H1 is described. FIG. 3B shows a schematic cross-sectional view along a line B-B in FIG. 1. FIG. 3B shows a cross-sectional view passing the centers of the first holes H1. The plurality of first holes H1 penetrates the first annular member 41 in its thickness direction. As shown in FIG. 3B, the first holes H1 are equally spaced apart from each other on a circumference. In the present embodiment, there are eight first holes H1. Openings of the plurality of first holes H1 are circular. The first holes H1 all have the same first opening area.

Figure 3C:
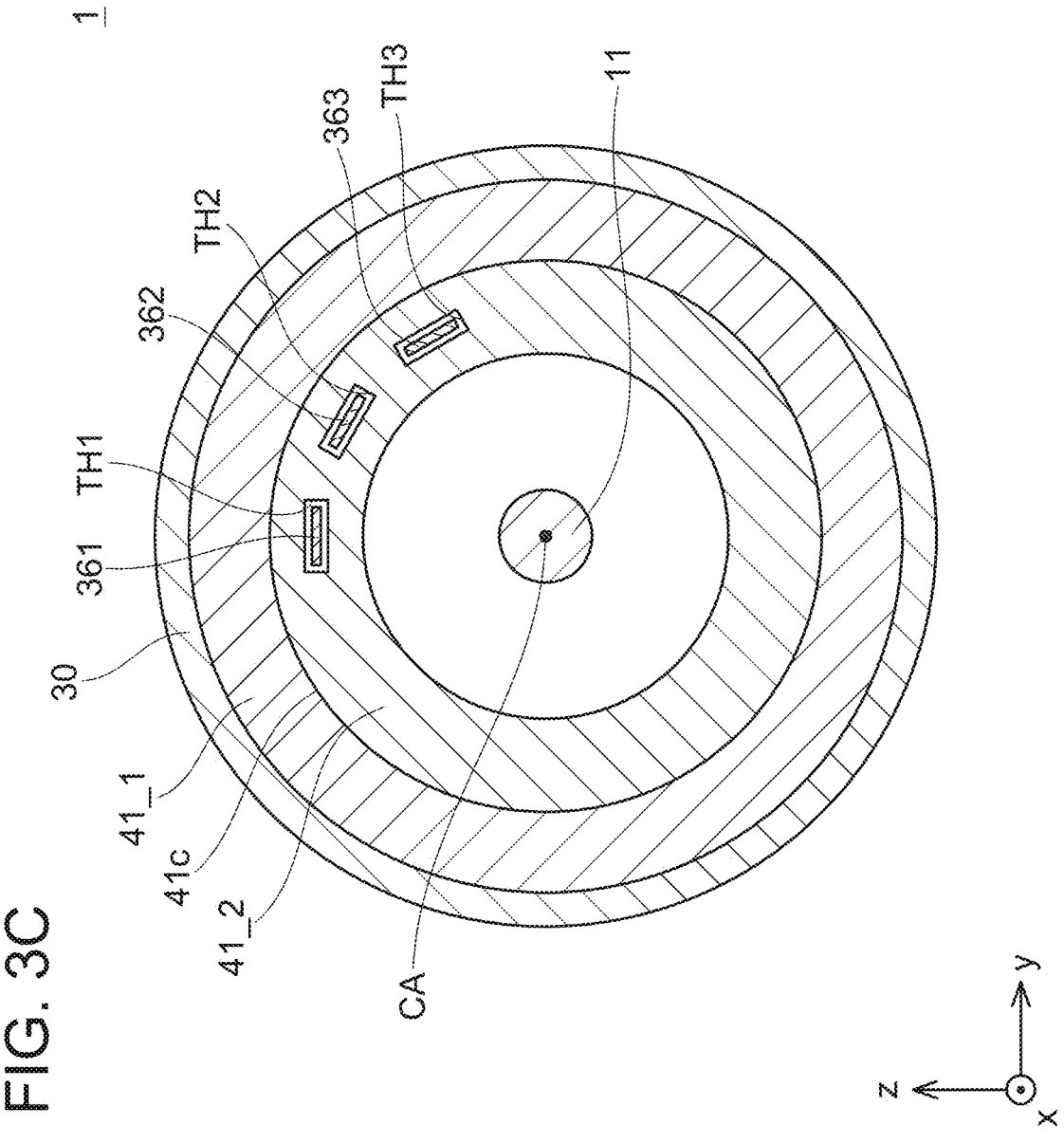
FIG. 3C is a schematic cross-sectional view along a line C-C in FIG. 1.

Referring to FIGS. 3A to 3C, the second portion 41_2 of the first annular member 41 is described. FIG. 3C shows a schematic cross-sectional view along a line C-C in FIG. 1. FIG. 3C shows a cross-sectional view passing a part of the first portion 41_1 and the second portion 41_2. In FIG. 3A, the stator core inner surface 21*i* is represented by an imaginary line. The second portion 41_2 protrudes radially inward from the connection 41*c* of the first portion 41_1. Further, the second portion 41_2 is interposed between the first coil end 22*e*1 and second inner wall surface 30*w*2. As shown in FIG. 3C, the second portion 41_2 may extend along the entire circumference. In this case, the second portion 41_2 has a ring shape about the center axis CA. Alternatively, the second portion 41_2 may extend along only a part of the circumference. There may be a region where the distance between the first coil end 22*e*1 and the second inner wall surface 30*w*2 is small along a part of the circumference due to various design reasons such as arrangements of gears and inverter. In this case, the second portion 41_2 may be located only at that region. This selectively enhances insulation for the desired region.

A radially inner end portion of the second portion 41_2 includes an inner end 41_2*i*. The inner end 41_2*i* is located radially outward of the stator core inner surface 21*i* by a distance DI. This prevents the second portion 41_2 from interrupting the rotation of the rotor 10 and the rotation shaft 11.

A radially outer end portion of the second portion 41_2 includes an outer end 41_2*o*. The outer end 41_2*o* has a thickness T1. The inner end 41_2*i* has a thickness T2. The thickness T2 is smaller than the thickness T1. Thus, the second portion 41_2 is tapered from its base toward its distal end. Since the weight is reduced near the distal end, a bending moment applied to the connection 41*c* can be reduced. Breakage of the second portion 41_2 and oscillation in the second portion 41_2 can be suppressed.

As shown in FIGS. 1 and 3C, power lines 361 to 363 are disposed at the first coil end 22*e*1. The power lines 361 to 363 are lead wires connected to ends of a U-phase coil, V-phase coil, and a W-phase coil, respectively. The power lines 361 to 363 protrude from the first coil end 22*e*1 in the axial direction (in +x-direction). In the present embodiment, the power lines 361 to 363 are copper bus bars. The second portion 41_2 comprises through holes TH1 to TH3 through which the power lines 361 to 363 extend, respectively. This prevents interference between the power lines 361 to 363 and the second portion 41_2.

Figure 4:
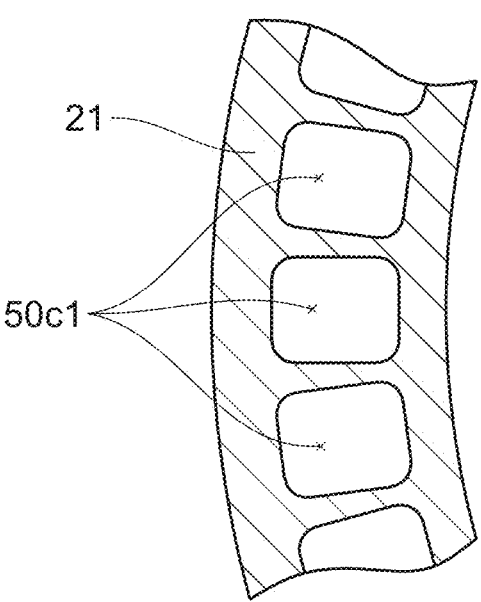
FIG. 4 is a partially enlarged view of a cross section along a line IV-IV in FIG. 2.
Figure 4:
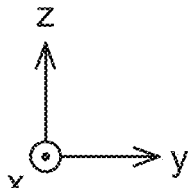
Figure 5:
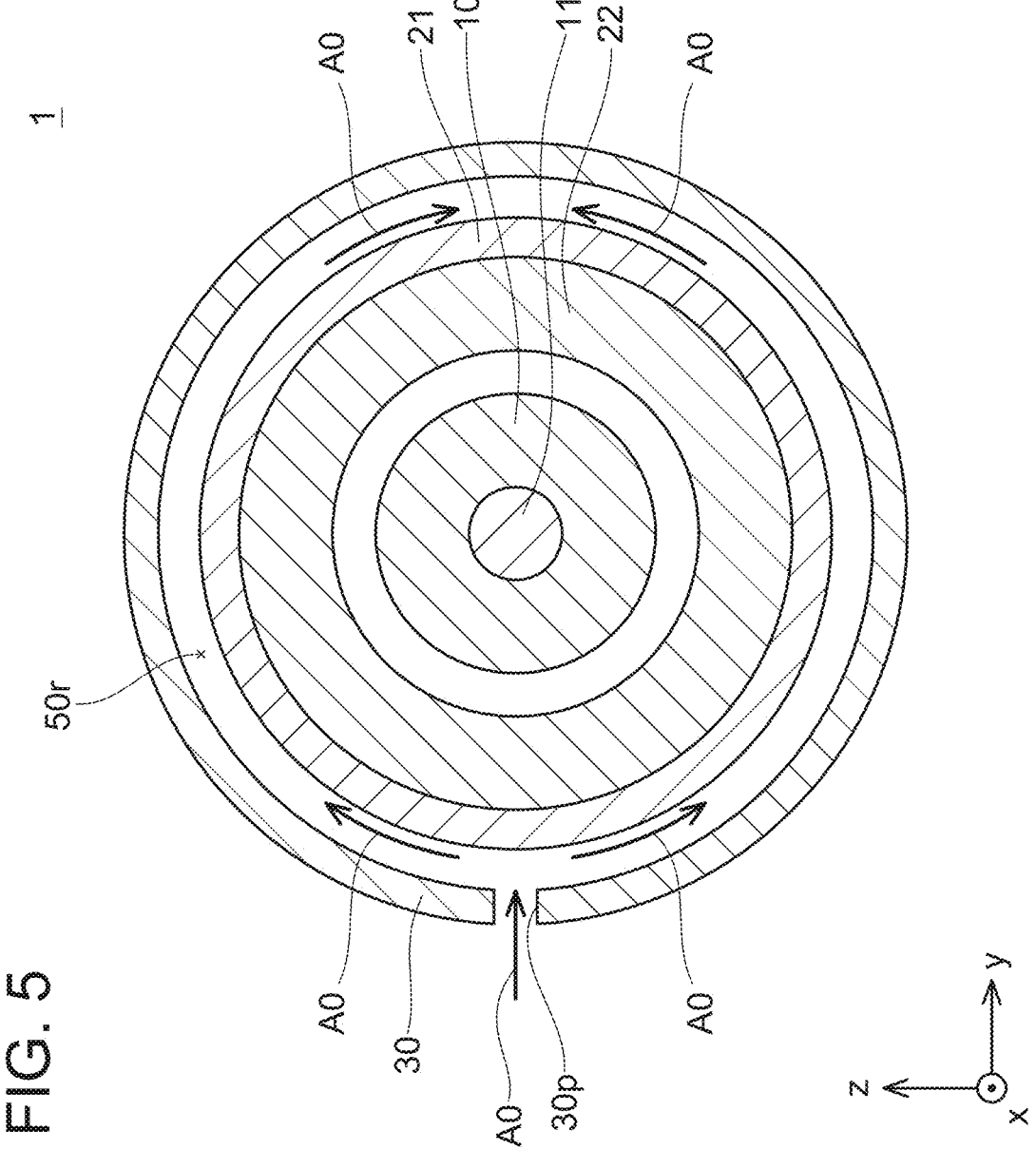
FIG. 5 is a schematic cross-sectional view along a line V-V lying on a center plane CP in FIG. 1.

Referring to FIGS. 1, 2, 4, and 5, the stator core 21 is described. FIG. 4 shows a partially enlarged view of a cross section along a line IV-IV in FIG. 2. FIG. 5 shows a schematic cross-sectional view along a line V-V lying on the center plane CP in FIG. 1. The stator core 21 is a cylindrical member. As shown in FIG. 2, the stator core 21 comprises an annular channel 50*r*, first channels 50*c*1, and second channels 50*c*2.

As shown in FIG. 5, the annular channel 50*r* is a groove defined in the stator core 21 to extend over the entire circumference thereof. The annular channel 50*r* is open upward. This opening is covered by the inner wall surface 30*w*, which defines a flow path. The annular channel 50*r* is in communication with the supply port 30*p* of the housing 30.

As shown in FIGS. 2 and 4, the first channels 50*c1* are tunnel-shaped flow paths defined in an outer circumferential surface of the stator core 21. In FIG. 2, the plurality of first channels 50*c1* and the plurality of second channels 50*c2* are represented by broken lines. The plurality of first channels 50*c1* extends from the annular channel 50*r* up to the first end face 21*e1*, which is oriented in +x-direction. The first channels 50*c1* extend parallel to each other and are equally spaced apart from each other in the circumferential direction. The plurality of second channels 50*c2* has the same configuration as that of the plurality of first channels 50*c1*. The plurality of second channels 50*c2* extends from the annular channel 50*r* up to the second end face 21*e2*, which is oriented in −x-direction.

The structure on +x-direction side relative to the center plane CP has been mainly described above. The structure on −x-direction side relative to the center plane CP is similar to that on +x-direction side. That is, there is a second annular member 42 that provides a seal between the second end face 21*e2* of the stator core 21 and the first inner wall surface 30*w1* of the housing 30. A space SP2 is defined between the second annular member 42 and the first inner wall surface 30*w1*. The second annular member 42 comprises a third portion 42_3 and a fourth portion 42_4. The third portion 42_3 has a cylindrical shape about the center axis CA. The third portion 42_3 is interposed between the second coil end 22*e2* and the first inner wall surface 30*w1*. The third portion 42_3 comprises a plurality of second holes H2 through which the cooling oil is injected toward the second coil end 22*e2*. The fourth portion 42_4 has a ring shape about the center axis CA. The fourth portion 42_4 protrudes radially inward from the third portion 42_3. Further, the fourth portion 42_4 is interposed between the second coil end 22*e2* and the third inner wall surface 30*w3*. Further description on the structure on −x-direction side relative to the center plane CP is omitted herein.

Operation

How the motor 1 operates is described. The cooling oil in the cooling oil reservoir flows through a pump and a supply pipe, which are not shown, and then flows into the supply port 30*p* of the housing 30. The cooling oil supplied through the supply port 30*p* flows into the annular channel 50*r*. This cooling oil flows within the annular channel 50*r* in the circumferential direction (see arrows A0 in FIGS. 2 and 5). Then, the cooling oil flows into each of the plurality of first channels 50*c1* and flows in +x-direction (see arrows A1 in FIG. 2). The cooling oil also flows into each of the plurality of second channels 50*c2* and flows in −x-direction (see arrows A2 in FIG. 2). Once reaching +x-direction ends of the first channels 50*c1*, the cooling oil is discharged into the space SP1 and reaches the first annular member 41. Similarly, once reaching −x-direction ends of the second channels 50*c2*, the cooling oil is discharged into the space SP2 and reaches the second annular member 42.

Referring to FIG. 3B, how the cooling oil is injected is described. Since the space SP1 is completely filled with the cooling oil, the cooling oil is pressured. The cooling oil is injected from each of the first holes H1 toward the first coil end 22*e1*. In FIG. 3B, an amount of the cooling oil injected from each first hole H1 is indicated by a vector JS1.

Effects

If insulation between a coil end and an inner wall surface of a housing is insufficient, electric discharge may occur between them. For this reason, a certain insulation distance needs to be provided between the coil end and the housing inner wall surface in order to ensure insulation. However, this increases the size of housing, and thus leading to increase in cost and installation space in a vehicle. This problem is problematic especially when a coil conductor is exposed from an insulator (e.g., insulating film) at the coil end. In the technology according to the present embodiment, the insulative first annular member 41 comprises the ring-shaped second portion 41_2 (see FIG. 3A), and this second portion 41_2 is interposed between the first coil end 22*e1* and the second inner wall surface 30*w2* of the housing 30. In this way, a passage of electricity between the first coil end 22*e1* and the second inner wall surface 30*w2* is blocked by the insulator, and thus insulation between them can be enhanced. This allows for a reduction in an insulation distance ID between the first coil end 22*e1* and the second inner wall surface 30*w2* as compared to configurations without the intervention of the second portion 41_2, and thus allows for a reduction in the size of the housing 30. The reduced insulation distance ID can be applied even in the configuration where the end portions ED of the segment coils 22*s* are exposed from the insulating films 26, since the second portion 41_2 ensures insulation.

In the technology according to the present embodiment, the plurality of first holes H1 is located between the first end face 21*e1* and the connection 41*c* (see FIG. 3A). Thus, the cooling oil is injected into a space interposed between the first end face 21*e1* and the second portion 41_2. Thus, the cooling oil injected from the first holes H1 can be guided by the second portion 41_2 toward the first coil end 22*e1*. For example, even when the cooling oil is injected in the axial direction as indicated by a dotted arrow A3, the second portion 41_2 can bounce off the cooling oil toward the first coil end 22*e1*. This increases an amount of the cooling oil reaching the first coil end 22*e1* and thus increases cooling efficiency.

Second Embodiment

Figure 6:
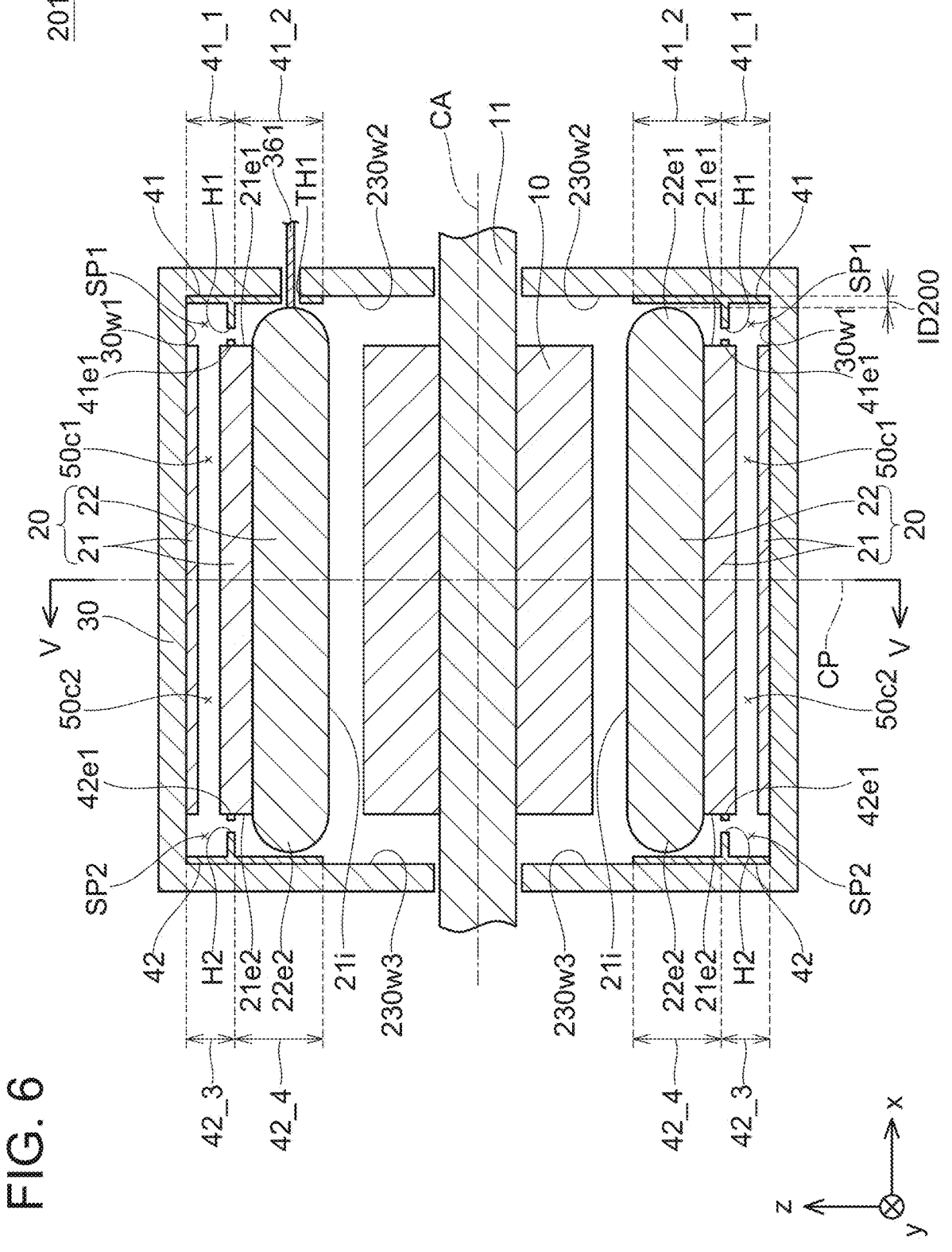
FIG. 6 is a schematic cross-sectional view of a motor 201.

FIG. 6 shows a schematic cross-sectional view of a motor 201. FIG. 6 shows a cross sectional view taken in the same manner as the cross-sectional view in FIG. 1 of the first embodiment. Configurations same as those described in connection with the first embodiment are labeled with the same reference signs, and description for them is omitted. Configurations unique to the second embodiment are labeled with reference signs having numbers of 200 or greater, for a distinction purpose.

The second portion 41_2 of the first annular member 41 is in contact with a second inner wall surface 230*w2*. The distance between the second portion 41_2 and the second inner wall surface 230*w2* is thus minimized. An insulation distance ID 200 in the second embodiment is smaller than the insulation distance ID (FIG. 3A) between the first coil end 22*e1* and the second inner wall surface 30*w2* in the first embodiment.

Similarly, the fourth portion 42_4 of the second annular member 42 is in contact with a third inner wall surface 230*w3*. The distance between the fourth portion 42_4 and the third inner wall surface 230*w3* is thus minimized. The size of the motor can thus be reduced.

The second portion 41_2 and the fourth portion 42_4 which have the same shape and function are located at the respective coil ends. Therefore, insulation and cooling performance of the same degree can be ensured at the both coil ends. Further, the same components can be used for both the first annular member 41 and the second annular member 42, which allows cost reduction.

Third Embodiment

Figure 7:
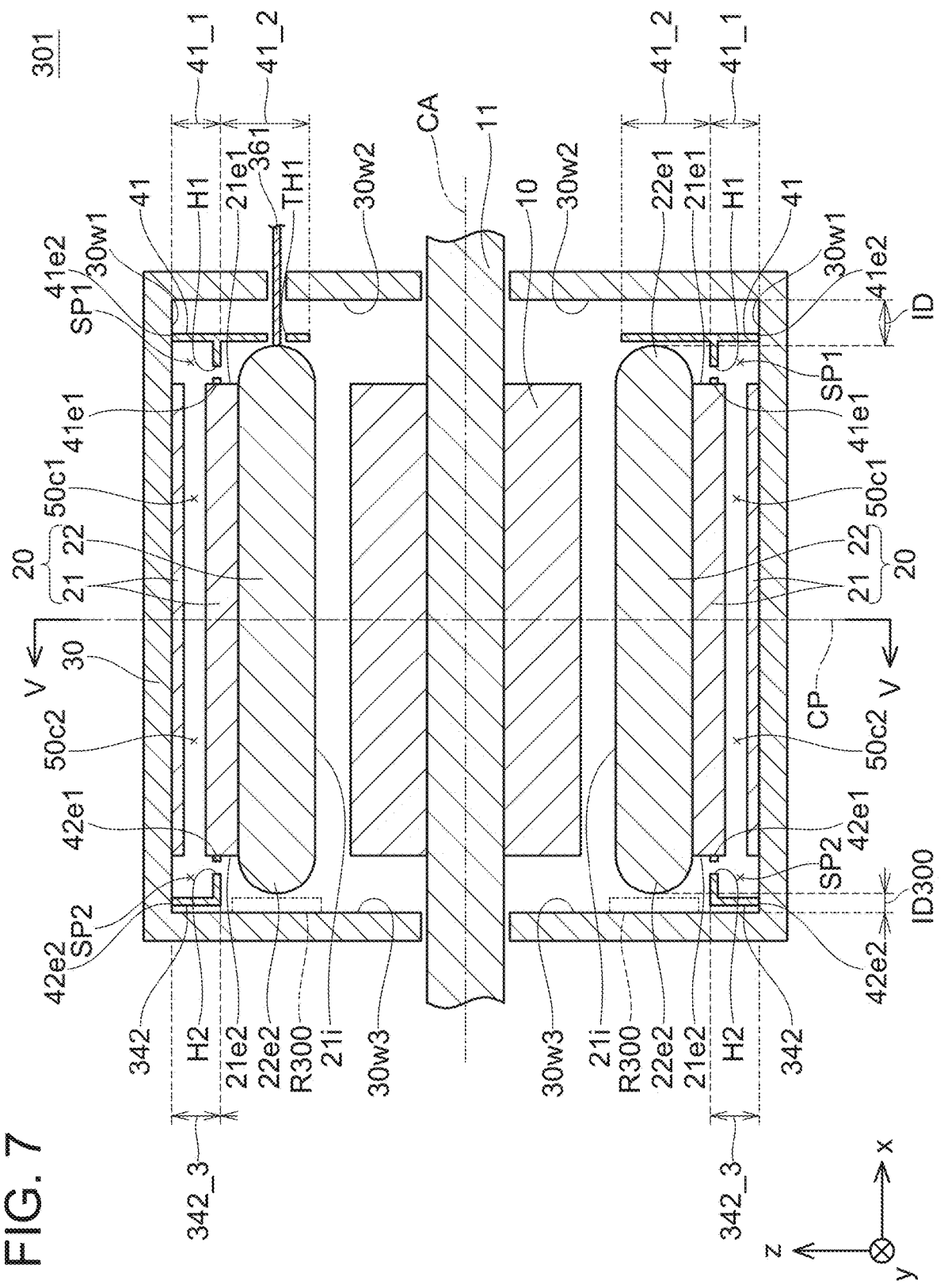
FIG. 7 is a schematic cross-sectional view of a motor 301.

A third embodiment is different from the first embodiment in the shape of a second annular member 342. Configurations same as those described in connection with the first embodiment are labeled with the same reference signs, and description for them is omitted. Configurations unique to the third embodiment are labeled with reference signs having numbers of 300 or greater, for a distinction purpose. FIG. 7 shows a schematic cross-sectional view of a motor 301 according to the third embodiment. FIG. 7 shows a cross sectional view taken in the same manner as the cross-sectional view in FIG. 1 of the first embodiment.

The second annular member 342 according to the third embodiment comprises a third portion 342_3 but does not comprise a portion corresponding to the fourth portion 42_4 of the first embodiment. Thus, the second annular member 342 does not comprise a portion interposed between the second coil end 22e2 and the third inner wall surface 30w3 (see a region R300). In other words, the second annular member 342 does not overlap the second coil end 22e2 as viewed in the axial direction (in x-direction).

Effects

The first coil end 22e1 includes the end portions ED exposed from the insulating films 26. On the other hand, the second coil end 22e2 is coated with the insulating film 26. Therefore, short circuit is more likely to occur between the first coil end 22e1 and the inner wall surface of the housing 30 than between the second coil end 22e2 and the inner wall surface of the housing 30. In the technology according to the present embodiment, insulation for the first coil end 22e1 is increased by the second portion 41_2 of the first annular member 41 as compared to insulation for the second coil end 22e2. The first coil end 22e1 is thus more intensively insulated. Since the second coil end 22e2 is insulated by the insulating film 26, an insulation distance ID 300 between the second coil end 22e2 and the third inner wall surface 30w3 is reduced as compared to the insulation distance between the first coil end 22e1 and the second inner wall surface 30w2. This contributes to a reduction in the overall size of the motor 301.

While specific examples of the present disclosure have been described above in detail, these examples are merely illustrative and place no limitation on the scope of the patent claims. The technology described in the patent claims also encompasses various changes and modifications to the specific examples described above. The technical elements explained in the present description or drawings provide technical utility either independently or through various combinations. The present disclosure is not limited to the combinations described at the time the claims are filed. Further, the purpose of the examples illustrated by the present description or drawings is to satisfy multiple objectives simultaneously, and satisfying any one of those objectives gives technical utility to the present disclosure.
Modification The shape of the openings of the first and second holes is not limited to circle but may be various other shapes. Further, the number and arrangement of the first and second holes are not limited to those described herein but may be different.

The through holes TH1 to TH3 may be in any shape. For example, they may be in the form of notches. The notches may be each open at the inner end 41_2i. The power lines 361 to 363 can be received into the notches through the open portions, and thus assembly is facilitated.

The insulator 27 covering the end portions ED of the segment coils 22s may be omitted. In this case, the conductor is exposed at the end portions ED, but insulation can be ensured by the second portion 41_2.

The inner end 41_2i of the second portion 41_2 may be in any shape. For example, it may comprise a rib wall.

What is claimed is:

1. A motor comprising:
a stator comprising a stator core and a coil;
a housing that houses the stator; and
a first annular member that is insulative and provides a seal between a first end face of the stator core in an axial direction of an axis of the stator core and an inner wall surface of the housing,
wherein
the coil comprises a first coil end protruding from the first end face,
the inner wall surface comprises a first inner wall surface radially facing the first coil end and a second inner wall surface facing the first coil end in the axial direction,
the first annular member comprises:
a first portion having a cylindrical shape about the axis and interposed between the first coil end and the first inner wall surface; and
a second portion protruding radially inward from the first portion and interposed between the first coil end and the second inner wall surface, and
the first portion comprises a plurality of first holes through which refrigerant is injected toward the first coil end,
the second portion has a ring shape about the axis, and
a thickness of a radial inner end of the second portion having the ring shape is less than a thickness of a radial outer end of the second portion.

2. The motor according to claim 1, wherein the plurality of first holes is located between the first end face and a connection at which the second portion is connected to the first portion.

3. The motor according to claim 1, wherein the first annular member is constituted of insulating resin.

4. The motor according to claim 1, wherein
the coil comprises a plurality of segment coils, outer surfaces of the segment coils being coated with insulating films, and
at the first coil end, ends of the plurality of segment coils are each exposed from the insulating films.

5. The motor according to claim 1, wherein
the stator core comprises a stator core inner surface that defines a cylindrical opening about the axis, and
the radial inner end of the second portion having the ring shape is located radially outward of the stator core inner surface.

6. The motor according to claim 1, wherein at least a part of the second portion is in contact with the second inner wall surface.

7. The motor according to claim 1, wherein
the motor further comprises a plurality of power lines projecting from the first coil end in the axial direction, and
the second portion comprises at least one through hole or at least one notch through which the plurality of power lines extends.

8. The motor according to claim 1, wherein the motor further comprises a second annular member that is insulative and provides a seal between a second end face of the stator core and the inner wall surface of the housing, the second end face being opposite to the first end face of the stator core in the axial direction, the coil comprises a second coil end protruding from the second end face of the stator core, the first inner wall surface of the housing radially faces the second coil end, the inner wall surface of the housing further comprises a third inner wall surface facing the second coil end in the axial direction, the second annular member comprises:

a third portion having a cylindrical shape about the axis and interposed between the second coil end and the third inner wall surface; and a fourth portion protruding radially inward from the third portion and interposed between the second coil end and the third inner wall surface, and the third portion comprises a plurality of second holes through which the refrigerant is injected toward the second coil end.

9. The motor according to claim 1, wherein the motor further comprises a second annular member that is insulative and provides a seal between a second end face of the stator core and the inner wall surface of the housing, the second end face being opposite to the first end face of the stator core in the axial direction, the coil comprises a second coil end protruding from the second end face of the stator core, the first inner wall surface of the housing radially faces the second coil end, the inner wall surface of the housing further comprises a third inner wall surface facing the second coil end in the axial direction, the second annular member has a cylindrical shape about the axis and is interposed between the second coil end and the first inner wall surface, the second annular member comprises a plurality of second holes through which the refrigerant is injected toward the second coil end, and the second annular member is not interposed between the second coil end and the third inner wall surface.

\* \* \* \* \*